US012259003B2

(12) United States Patent
Capoldi et al.

(10) Patent No.: US 12,259,003 B2
(45) Date of Patent: Mar. 25, 2025

(54) ROLLING BEARING WITH A GUIDING FLANGE FOR A CAGE

(71) Applicant: Aktiebolaget SKF, Gothenburg (SE)

(72) Inventors: Bruno Capoldi, Charentenay (FR); Herve Dondaine, Avallon (FR)

(73) Assignee: Aktiebolaget SKF, Gothenburg (SE)

( * ) Notice: Subject to any disclaimer, the term of this patent is extended or adjusted under 35 U.S.C. 154(b) by 58 days.

(21) Appl. No.: 17/577,431

(22) Filed: Jan. 18, 2022

(65) Prior Publication Data
US 2022/0243765 A1 Aug. 4, 2022

(30) Foreign Application Priority Data

Jan. 29, 2021 (DE) .......................... 102021102134.0

(51) Int. Cl.
F16C 19/38 (2006.01)
F16C 19/18 (2006.01)
F16C 33/58 (2006.01)

(52) U.S. Cl.
CPC .......... F16C 19/381 (2013.01); F16C 33/585 (2013.01); F16C 19/188 (2013.01)

(58) Field of Classification Search
CPC .... F16C 19/188; F16C 19/381; F16C 19/505; F16C 33/3806; F16C 33/4605; F16C 33/585; F16C 33/586; F16C 33/60; F16C 2300/14
See application file for complete search history.

(56) References Cited

U.S. PATENT DOCUMENTS

| 4,422,697 A * | 12/1983 | Gugel | F16C 19/49 384/452 |
|---|---|---|---|
| 4,861,171 A | 8/1989 | Adachi | |
| 9,624,977 B2 * | 4/2017 | Terada | F16C 19/26 |
| 2014/0023305 A1 | 1/2014 | Frank | |
| 2016/0245333 A1 | 8/2016 | Fiesel et al. | |
| 2021/0102575 A1 | 4/2021 | Altmayer et al. | |
| 2021/0156422 A1 | 5/2021 | Altmayer et al. | |
| 2022/0243763 A1 * | 8/2022 | Capoldi | F16C 19/185 |

FOREIGN PATENT DOCUMENTS

| EP | 2851575 B1 | 5/2016 |
| FR | 2749357 | * 12/1997 |
| JP | 63312512 | * 12/1988 |

OTHER PUBLICATIONS

Translation of FR2749357 obtained Jan. 4, 2024.*

* cited by examiner

Primary Examiner — James Pilkington
(74) Attorney, Agent, or Firm — GARCIA-ZAMOR INTELLECTUAL PROPERTY LAW, LLC; Ruy Garcia-Zamor

(57) ABSTRACT

The bearing includes a first ring, a second ring, at least one row of radial and axial rolling elements arranged between axial and radial raceways provided on the rings. The second ring has a protruding nose engaged into an annular groove of the first ring and provided with the axial raceway and with the radial raceway of the second ring. The bearing further provides at least one cage for maintaining the row of axial rolling elements, at least one flange for guiding and maintaining the cage in radial direction, and a plurality of fixing screws to secure the flange to the first ring. The flange axially abuts against a flat surface of the first ring. The fixing screws extend axially through the flat surface of the first ring.

8 Claims, 4 Drawing Sheets

ROLLING BEARING WITH A GUIDING FLANGE FOR A CAGE

CROSS-REFERENCE TO RELATED APPLICATIONS

Figure 1:
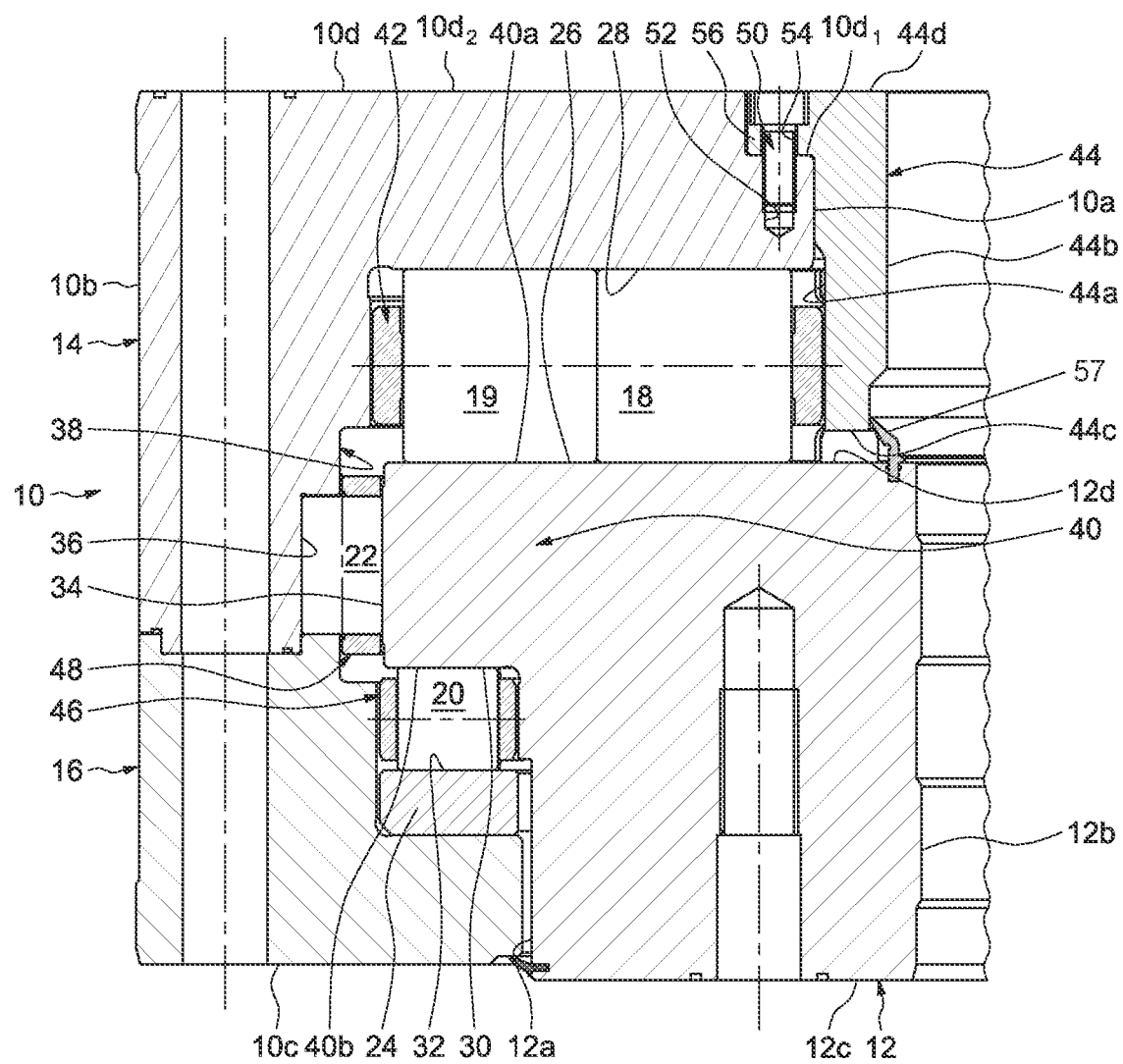

This application claims priority to German Patent Application no. 102021102134.0, filed Jan. 29, 2021, the contents of which is fully incorporated herein by reference.

TECHNICAL FIELD OF THE INVENTION

The present invention relates to the field of rolling bearings. The invention notably relates to the field of large-diameter rolling bearings having an inner ring and an outer ring arranged concentrically about an axis of rotation running in an axial direction.

BACKGROUND OF THE INVENTION

Such large-diameter rolling bearings may be used for example in a tunnel boring machine, in a mining extraction machine or in a wind turbine.

A large-diameter rolling bearing comprises two concentric inner and outer rings, and at least two rows of axial and radial rollers arranged between the rings. The row of axial and radial rollers are arranged between a nose provided on the inner or outer ring which is named "nose ring", and a groove formed on the other ring. The rolling bearing further comprises at least one cage for maintaining the row of axial rollers. For example, it is possible to refer to EP 2851575 B1.

In specific designs, a flange for guiding the cage is secured to the outer or inner ring which delimits the groove. If the inner ring delimits the groove, the flange is radially mounted into contact against the outer cylindrical surface of this inner ring. Alternatively, if the outer ring delimits the groove, the flange is radially mounted against contact into the cylindrical bore of this outer ring.

A plurality of fixing screws is used to secure the flange on the inner or outer ring. The screws are spaced apart in the circumferential direction. Each screw extends radially through the flange and is engaged inside a threaded hole formed on the outer cylindrical surface of the inner ring, or alternatively formed on the cylindrical bore of the outer ring.

In both cases, some of the fixing screws may be broken at the cylindrical interface between the flange and the inner or outer ring during operation when the rolling is subjected to vibrations. The broken parts of the screws may fall into the gearing system of the associated machine with important damages.

One aim of the present invention is to overcome this drawback.

SUMMARY OF THE INVENTION

The invention relates to a rolling bearing comprising a first ring, a second ring, at least one row of radial rolling elements arranged between axial raceways provided on the rings, and at least one row of axial rolling elements arranged between radial raceways provided on the rings.

The terms "axial rolling elements" is understood to mean rolling elements adapted to accommodate axial loads. The terms "radial rolling elements" is understood to mean rolling elements adapted to accommodate radial loads.

The second ring comprises a protruding nose engaged into an annular groove of the first ring. The nose is provided with the axial raceway and with the radial raceway of the second ring.

The rolling bearing also comprises at least one cage for maintaining the row of axial rolling elements. The rolling bearing further comprises at least one flange for guiding and maintaining the cage in radial direction.

The rolling bearing further comprises a plurality of fixing screws to secure the flange to the first ring.

According to a first general feature, the flange axially abuts against a flat surface of the first ring.

According to a second general feature, the fixing screws extend axially through the flat surface of the first ring.

With such design, the risk of screw breaking is highly reduced due to the flat contact surface between the guiding flange and the first ring. There is no gap between the guiding flange and the first ring.

The groove may be provided with the axial raceway and with the radial raceway of the first ring.

Preferably, the flat surface of the first ring extends radially. Alternatively, the flat surface of the first ring may have other shape. For example, the flat surface of the first ring may extend obliquely.

In a first embodiment, the first ring is provided with opposite frontal faces which axially delimit the axial thickness of the first ring, the flat surface of the first ring onto which axially abuts the flange being formed on one of these frontal faces.

The frontal face of the first ring may have a stepped shape and may be provided with a first surface and with a second surface which is axially offset outwards with respect to the first surface, the flat surface of the first ring onto which axially abuts the flange being formed by the first surface. Advantageously, the fixing screws may remain axially offset inwards with respect to the second surface or being flush with the second surface.

Alternatively, the frontal face of the first ring may extend in one single radial plane.

In a second embodiment, the flat surface of the first ring onto which axially abuts the flange is formed on the groove of the first ring.

In one embodiment, the first ring comprises at least a supporting ring and a retaining ring stacked one relative to the other in the axial direction, the flange being secured to the supporting ring. In this case, the radial raceway of the first ring may be provided on the supporting ring.

In one embodiment, the fixing screws extend axially through the flange and are engaged inside threaded holes extending axially from the flat surface of the first ring.

Alternatively, the fixing screws may extend axially through the first ring and may be engaged inside threaded holes of the flange.

In one embodiment, the flange may radially protrude with respect to the first ring. Alternatively, the flange may be flush with a cylindrical surface of the first ring.

In one embodiment, the rolling bearing comprises at least two rows of axial rolling elements being disposed axially on both sides of the nose of the second ring.

In one embodiment, the first ring is the outer ring and the second ring is the inner ring. Alternatively, the first ring may be the inner ring and the second ring may be the outer ring.

BRIEF DESCRIPTION OF THE INVENTION

Figure 2:
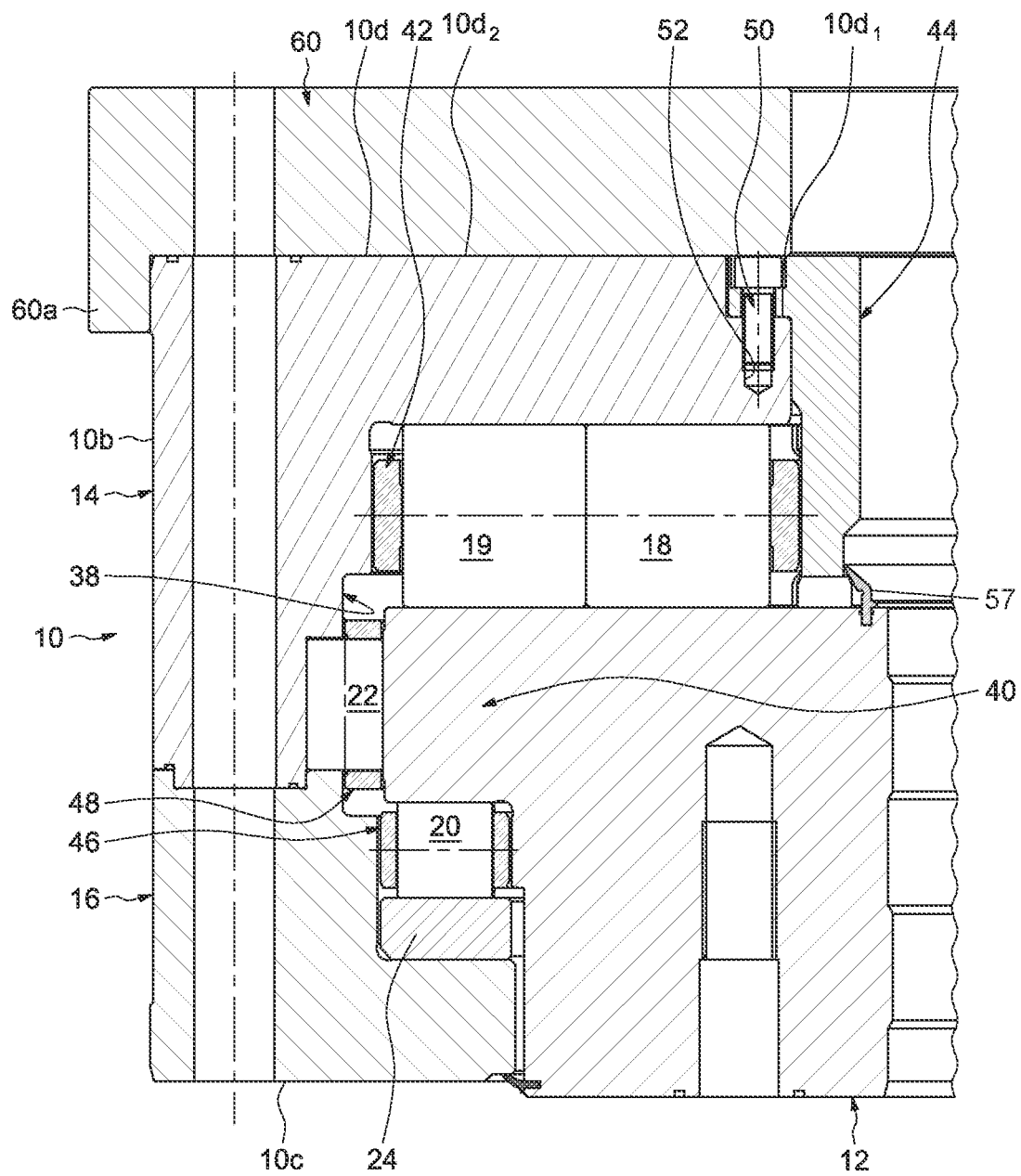
Figure 3:
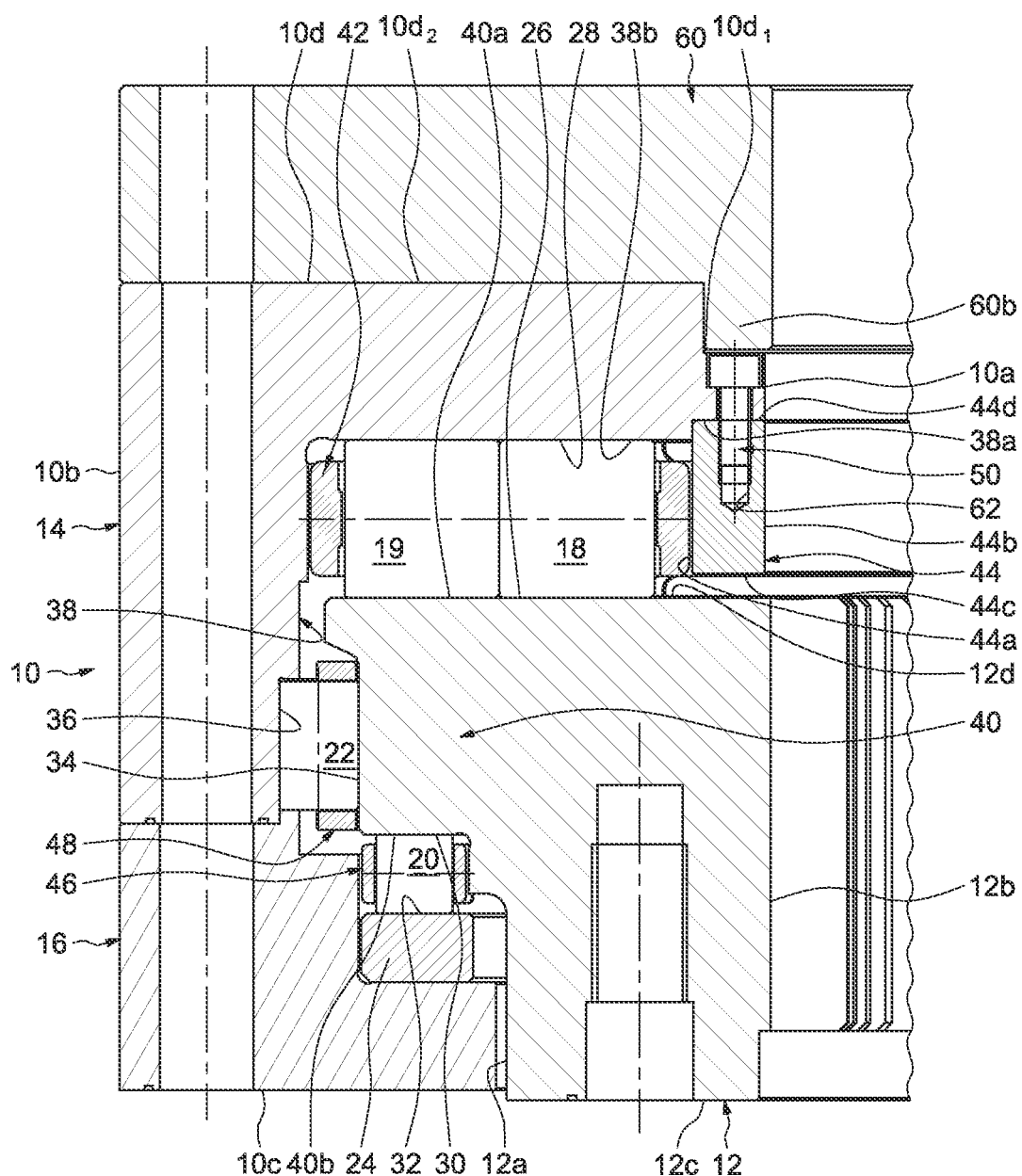
Figure 4:
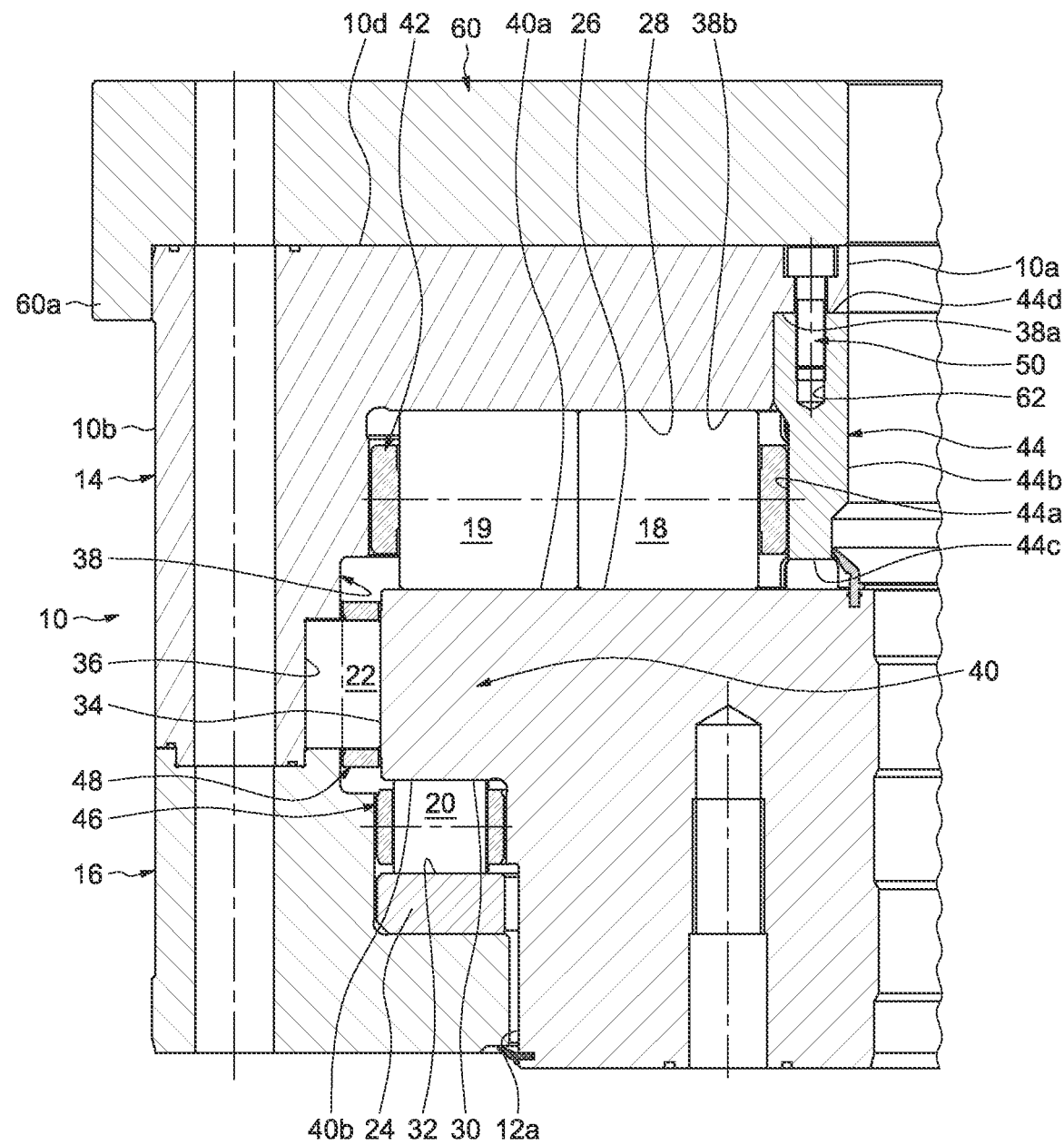

The present invention and its advantages will be better understood by studying the detailed description of specific embodiments given by way of non-limiting examples and illustrated by the appended drawings on which:

FIG. 1 is a partial cross-section of a rolling bearing according to a first example of the invention, FIG. 2 is a partial cross-section of the rolling bearing of FIG. 1 with a frame positioned on an outer ring of the rolling bearing, FIG. 3 is a partial cross-section of a rolling bearing according to a second example of the invention with a frame positioned on an outer ring of the rolling bearing, and FIG. 4 is a partial cross-section of a rolling bearing according to a third example of the invention with a frame positioned on an outer ring of the rolling bearing.

DETAILED DESCRIPTION OF THE INVENTION

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. In this example, the inner ring 12 is a rotative ring and the outer ring 10 is a non-rotative ring. The rolling bearing may for example be used in a tunnel boring machine, a wind turbine or any other applications using a large diameter rolling bearing.

The outer and inner rings 10, 12 are concentric and extend axially along the bearing rotation axis (not shown) which runs in an axial direction. In the illustrated example, the rings 10, 12 are of the solid type.

The outer ring 10 is formed as a split ring and comprises a first supporting ring 14 and a second retaining ring 16 stacked one relative to the other in the axial direction. Each of the supporting and retaining rings 14, 16 of the outer ring is provided with a plurality of aligned through-holes (not referenced) in order to be joined by fitting bolts.

In the illustrated example, the rolling bearing comprises three rows of axial rollers 18, 19, 20 which are arranged between the outer and inner rings 10, 12 in order to form an axial thrust, and a row of radial rollers 22 which are arranged between the rings to form a radial thrust.

In the illustrated example, the rolling bearing also comprises a thrust ring 24 axially mounted between the row of axial rollers 20 and the outer ring 10. Such a thrust ring 24 may be named "elastic ring". The thrust ring 24 is axially interposed between the row of axial rollers 20 and the retaining ring 16 of the outer ring. The rolling bearing further comprises a plurality of spring systems (not shown) to axially push the thrust ring 24 against the axial rollers 20. The spring systems are mounted on the retaining ring 16 of the outer ring. Alternatively, the rolling bearing may be deprived of such thrust ring 24 and spring systems.

The rollers 18, 19, 20, 22 of one row are identical to one another. Each roller 18, 19, 20, 22 comprises a cylindrical outer rolling surface. The axis of rotation of each roller 22 is parallel to the axis of the bearing and perpendicular to the axes of each of the rollers 18, 19, 20. In the illustrated example, the row of rollers 18 is superimposed on the row of rollers 19. Alternatively, the two rows of rollers 18, 19 may be replaced by one row of rollers.

The rollers 18, 19 are arranged axially between annular radial raceways 26, 28 respectively formed on the inner and outer rings 12, 10. The radial raceway 28 is formed on the supporting ring 14 of the outer ring. The raceways 26, 28 face each other in the axial direction.

The rollers 20 are arranged axially between annular radial raceways 30, 32 respectively formed on the inner ring 12 and the thrust ring 24. The raceways 30, 32 axially face each other. The rows of rollers 18, 19 and the row of rollers 20 are spaced apart from each other in the axial direction.

The rollers 22 are arranged radially between annular axial raceways 34, 36 respectively formed on the inner and outer rings 12, 10. The radial raceway 36 is formed on the supporting ring 14 of the outer ring. The raceways 34, 36 face each other in the radial direction. The row of rollers 22 is radially offset outwards with respect to the rows of rollers 18, 19, 20. The row of rollers 22 is axially located between the rows of rollers 18, 19, 20.

The outer ring 10 comprises an annular groove 38 opening in a radial direction inwardly towards the inner ring 12. The outer ring 10 comprises an inner stepped cylindrical surface or bore 10a from which the groove 38 is formed.

The outer ring 10 also comprises an outer cylindrical surface 10b which is radially opposite to the bore 10a. The outer ring 10 further comprises two opposite radial frontal faces 10c, 10d which axially delimit the bore 10a and the outer surface 10b of the ring. The frontal faces 10c, 10d delimit the axial thickness of the outer ring 10. As will be described later, the frontal face 10d of the outer ring has a stepped shape. The frontal face 10c is formed on the retaining ring 16 and the frontal face 10d is formed on the supporting ring 14.

The inner ring 12 comprises an annular protruding nose 40 engaging into the annular groove 38 of the outer ring. The nose 40 extends radially outwards. The nose 40 protrudes radially from an outer cylindrical surface 12a of the inner ring.

The inner ring 12 also comprises an inner cylindrical bore 12b which is radially opposite to the outer cylindrical surface 12a. In the illustrated example, the bore 12a of the inner ring is provided with a gear teeth (not referenced). The inner ring 12 further comprises two opposite radial frontal faces 12c, 12d which axially delimit the outer cylindrical surface 12a and the bore 12b.

The rows of rollers 18, 19, 20 are arranged axially between the nose 40 of the inner ring and the groove 38 of the outer ring. The rows of rollers 18, 19 are disposed on one side of the nose 40, and the row of rollers 20 is disposed on the other side.

The radial raceway 26 is located on the nose 40. A first radial flank 40a of the nose delimits the radial raceway 26. A second opposite radial flank 40b of the nose delimits the radial raceway 30. The opposite first and second flanks 40a, 40b of the nose delimit axially the nose. The radial raceway 28 is located on the groove 38 of the outer ring. The radial raceway 32 is located on the thrust ring 24.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. An axial bottom of the groove 38 delimits the axial raceway 36. The axial raceway 36 radially faces the outer cylindrical surface of the nose 40 onto which is formed the axial raceway 34. The outer cylindrical surface of the nose 40 and the outer cylindrical surface 12b are radially offset.

As a result, the axial raceway 34 and the outer cylindrical surface 12b are also radially offset. The outer cylindrical surface of the nose 40 extends axially between the opposite radial flanks 40a, 40b of the nose.

In the illustrated example, the inner ring 12 is made in one part. Alternatively, the inner ring 12 may be divided in the axial direction in at least two separate parts secured together.

In another variant, the nose 40 may be made separately from the main part of the inner ring.

As previously mentioned, the outer ring 10 is divided in the axial direction in two separate parts, the supporting ring 14 and the retaining ring 16. The supporting and retaining rings 14, 16 delimit together the groove 38.

The rolling bearing further comprises a cage 42 for maintaining the axial rollers 18, 19 spaced apart in the circumferential direction. As will be described later, the rolling bearing also comprises an annular flange 44 for guiding and maintaining the cage 42 in the radial direction.

The cage 42 maintains a regular circumferential spacing between the axial rollers 18, 19. The cage 42 is housed inside the annular space defined axially between the inner ring 12 and the outer ring and defined radially between the outer ring and the flange 44. Each axial roller 18, 19 is maintained by the cage 42.

The cage 42 delimits a plurality of pockets each configured to receive one axial roller 18 and one axial roller 19. As previously mentioned, in the illustrated example, the rolling bearing comprises the two rows of superimposed rollers 18, 19.

Alternatively, the rolling bearing may comprise only one row of rollers arranged between the raceways 26, 28. In this case, each pocket of the cage receives only one axial roller.

The cage 42 may be segmented in the circumferential direction and formed by a plurality of successive cage segments. The cage 42 may be made for example from metal such as steel, brass or from plastic material.

Similarly, the rolling bearing further comprises cages 46, 48 for respectively maintaining the rollers 20, 22 spaced apart in the circumferential direction.

As previously mentioned, the flange 44 is provided for guiding the cage 42 but also for maintaining the cage in the radial direction. The flange 44 is secured to the outer ring 10. The flange 44 is secured to the supporting ring 14 of the outer ring. The flange 44 extends perpendicularly to the raceways 26, 28 of the inner and outer rings.

In the illustrated example, the flange 44 is radially offset inwards with regard to the cage 42. A slight radial gap (not referenced) is provided between the cage 42 and the flange 44. The cage 42 is mounted around the flange 44. The cage 42 is freely movable in rotation with regard to the flange 44.

The flange 44 axially abuts against the frontal face 10d of the inner ring. As previously mentioned, in the illustrated example, the frontal face 10d has a stepped shape. The frontal face 10d is provided with a flat radial first surface $10d_1$ onto which axially abuts the flange 44, and with a flat radial second surface $10d_2$ which is axially offset outwards with respect to the first surface. An axial wall extends between the first and second surfaces $10d_1$, $10d_2$ of the frontal face 10d.

Alternatively, it could be possible to provide the outer ring with an entire flat frontal face 10d extending in one single radial plane of the rolling bearing.

The rolling bearing comprises a plurality of fixing screws 50 to secure the flange 44 to the outer ring 10. The screws 50 are spaced apart in the circumferential direction, preferably regularly. The screws 50 extend axially through the flat first surface $10d_1$ of the frontal face 10d of the inner ring. In the illustrated example, the screws 50 extend axially through flange 44.

Each screw 50 is engaged inside a threaded hole 52 of the outer ring 10. Each threaded hole 52 extends axially from the flat first surface $10d_1$ of the frontal face 10d of the outer ring. Each screw 50 extends axially inside a through-hole 54 made into the flange 44.

Accordingly, the flange 44 comprises a plurality of through-holes 54 spaced apart in the circumferential direction. Each through-hole 54 of the flange extends axially.

In the illustrated example, the flange 44 is provided with an annular collar 56 protruding radially outwards and abutting against the flat first surface $10d_1$ of the frontal face 10d of the outer ring. The through-holes 54 of the flange are provided on the collar 56. The collar 56 of the flange is flat. The head of each screw 50 axially abuts against the collar 56. In the illustrated example, each screw 50 is housed inside the collar 56 of the flange 44. Alternatively, the screw 50 may slightly protrude axially with respect to collar 56.

The flange 44 comprises an outer cylindrical surface 44a which form a guiding surface onto which may bear the cage 42. The flange 44 also comprises an inner cylindrical bore 44b which is radially opposite to the outer cylindrical surface 44a.

The flange 44 further comprises two opposite radial frontal faces 44c, 44d which axially delimit the outer surface 44a and the bore 44b. The frontal faces 44c, 44d delimit the axial thickness of the outer flange 44. The collar 56 radially protrudes outwards from the cylindrical surface 44a. The collar 56 radially extends the frontal face 44d.

The frontal face 44c of the flange remains axially spaced apart from the inner ring 12. Wherein a seal 57 located on the side of the inner ring 12 is configured to abut the axial end of the flange 44. In the illustrated example, the frontal face 44d of the flange is flush with the second surface $10d_2$ of the frontal face 10d of the outer ring.

The flange 44 is radially mounted into the bore 10a of the outer ring. The outer cylindrical surface 44a radially comes into contact with the bore 10a of the outer ring. The flange 44 radially protrudes inwards with respect to the bore.

The flange 44 has an annular form. The flange 44 forms a sleeve. The flange 44 may be made in one part. Alternatively, the flange 44 may be segmented in the circumferential direction. The flange 44 may be made for example from metal such as steel, brass or from plastic material.

When the rolling bearing is mounted into the associated machine, a frame 60 is positioned on the outer ring 10, namely on the second surface $10d_2$ of the frontal face 10d of the outer ring as shown on FIG. 2. In this example, the frame 60 is radially centered onto the outer ring 10 by an outer annular axial portion 60a of the frame.

The frame 60 axially faces each screw 50. More precisely, the frame 60 axially faces the head of each screw 50. The frame 60 enables to retain and block one or several screws 50 if the vibrations applied to the rolling bearing detach or break these screws.

The example shown on FIG. 3, in which identical parts are given identical references, mainly differs from the first example in that the flange 44 abuts against the groove 38 of the inner ring. In this second example, the axial length of the flange 44 is reduced.

In the illustrated example, the groove 38 has a stepped shape. The groove 38 is provided with a flat radial first surface 38a onto which axially abuts the flange 44 and with a flat radial second surface 38b which is axially offset inwards with respect to the first surface.

The frontal face 44d of the flange axially abuts against the radial surface 38a of the groove. An axial wall extends between the first and second surfaces 38a, 38b of the groove. The radial raceway 28 is formed on the second surface 38b of the groove.

Alternatively, it could be possible to provide a single radial flat surface delimiting the radial raceway 28 and onto which axially abuts the flange. In this example, the flange 44 is flush with the bore 10a of the outer ring.

In this second example, the screws 50 extend axially through the outer ring 10, namely through the supporting ring 14. Therefore, the screws 50 extend axially through the radial surface 38a of the groove. Each screw 50 is engaged inside a threaded hole 62 of the flange 44. Each threaded hole 62 extends axially from the frontal face 44d of the flange.

Each screw 50 extends axially inside a through-hole (not referenced) made into the outer ring 10. Accordingly, the outer ring 10 comprises a plurality of through-holes spaced apart in the circumferential direction. Each through-hole of the outer ring 10 extends axially. Each through-hole 54 opens on the first surface 10d₁ of the frontal face 10d and on the first surface 38a of the groove.

The head of each screw 50 axially abuts against the frontal face 10d of the outer ring. The head of each screw 50 axially abuts against the flat first surface 10d₁ of the frontal face 10d.

As shown on FIG. 3, in this example, when the rolling bearing is mounted into the associated machine, the frame 60 is centered on the outer ring 10 by an inner annular axial portion 60b of the frame. The axial portion 60b axially faces each screw 50.

More precisely, the axial portion 60b of the frame axially faces the head of each screw 50. The axial portion 60b of the frame enables to retain and block one or several screws 50 if the vibrations applied to the rolling bearing detach or break these screws.

The example shown on FIG. 4, in which identical parts are given identical references, mainly differs from the previous example in that the entire frontal face 10d of the outer ring is flat and extends in one single radial plane of the rolling bearing.

Otherwise, as previously mentioned, in these examples, the first ring of the rolling bearing is the fixed outer ring 10 whereas the second ring is the rotative inner ring 12.

As an alternative, it could be possible to provide a reversed arrangement with the first ring forming the fixed inner ring and the second ring forming the rotative outer ring.

In this case, the outer ring is provided with the protruding nose 40 which extends radially inward. The groove 38 is formed on the inner ring and opens radially outwards. The nose 40 engages into the groove 38.

In such embodiment, the guiding flange 44 is secured to the inner ring. The flange is radially offset outwards with regard to the cage 42. The flange is mounted around the cage 42. The bore of the flange forms the guiding surface onto which may bear the cage 42. The flange is secured to the inner ring as previously described for the illustrated examples.

In the described examples, the rolling bearing is provided with four rows of rolling elements. Alternatively, the rolling bearing may comprise only two rows of rolling elements, or three rows of rolling elements, or five or more rows of rolling elements. In the illustrated example, the rolling elements are rollers. The rolling bearing may comprise other types of rolling elements, for example balls.

The invention claimed is:

1. A rolling bearing comprising:
   a first ring that forms an outer bearing ring, the first ring having an annular groove positioned medially therealong, the first ring comprising a supporting ring and a retaining ring in contact with one another,
   a second ring that forms an inner bearing ring, wherein the annular groove of the first ring faces the second ring, the second ring having a protruding nose which extends into the annular groove of the first ring such that the first time borders first and second radially extending axial sides of the protruding nose,
   at least one row of radial rolling elements arranged between axial raceways provided on the supporting ring and the second ring, and
   at least one row of axial rolling elements arranged between radial raceways provided on the supporting ring and the second ring, the protruding nose which is positioned in the annular groove of the first ring is provided with the axial raceway of the second ring and is also provided with the radial raceway of the second ring,
   a thrust ring interposed between the retaining ring and another row of axial rolling elements, which are located on an opposite side of the protruding nose from the at least one row of axial rolling elements, wherein the thrust ring forms at least one radial raceway for the another row of axial rolling elements,
   at least one cage for maintaining the at least one row of axial rolling elements,
   at least one flange for guiding and maintaining the cage in radial direction, and a plurality of fixing screws to secure the flange to the supporting ring, wherein
   the flange axially abuts against a flat surface of the supporting ring, the fixing screws extending axially through the flat surface of the supporting ring, the flange having an axial end that includes a frontal face distal from the fixing screws which forms a gap between the flange and a side of the second ring, one of the radial raceways for the at least one row of axial rolling elements is formed on the side of the second ring facing the flange, and
   a seal located on the side of the second ring and configured to abut the axial end of the flange.

2. The rolling bearing according to claim 1, wherein the flat surface of the supporting ring extends radially.

3. The rolling bearing according to claim 1, wherein the first ring is provided with opposite frontal faces which axially delimit the axial thickness of the first ring, the flat surface of the first ring onto which axially abuts the flange being formed on one of these frontal faces.

4. The rolling bearing according to claim 3, wherein the frontal face of the supporting ring that the flange abuts has a stepped shape and is provided with a first surface and with a second surface which is axially offset outwards with respect to the first surface, the flat surface of the supporting ring onto which axially abuts the flange being formed by the first surface, the fixing screws remaining axially offset inwards with respect to the second surface or being flush with the second surface.

5. The rolling bearing according to claim 1, wherein the fixing screws extend axially through the flange and are engaged inside threaded holes extending axially from the flat surface of the supporting ring.

6. The rolling bearing according to claim 1, wherein the flange radially protrudes with respect to a cylindrical surface of the supporting ring, or is flush with the cylindrical surface of the supporting ring.

7. A rolling bearing comprising:
a first ring,
a second ring,
at least one row of radial rolling elements arranged between axial raceways provided on the rings, and
at least one row of axial rolling elements arranged between radial raceways provided on the rings, the second ring comprising a protruding nose engaged into an annular groove of the first ring and provided with the axial raceway and with the radial raceway of the second ring,
at least one cage for maintaining the row of axial rolling elements,
at least one flange for guiding and maintaining the cage in radial direction, and a plurality of fixing screws to secure the flange to the first ring, wherein
the flange axially abuts against a flat surface of the first ring, the fixing screws extending axially through the flat surface of the first ring, wherein the flat surface of the first ring onto which axially abuts the flange is formed in the groove of the first ring.

8. A rolling bearing comprising:
a first ring,
a second ring,
at least one row of radial rolling elements arranged between axial raceways provided on the rings, and
at least one row of axial rolling elements arranged between radial raceways provided on the rings, the second ring comprising a protruding nose engaged into an annular groove of the first ring and provided with the axial raceway and with the radial raceway of the second ring,
at least one cage for maintaining the row of axial rolling elements,
at least one flange for guiding and maintaining the cage in radial direction, and a plurality of fixing screws to secure the flange to the first ring, wherein
the flange axially abuts against a flat surface of the first ring, the fixing screws extending axially through the flat surface of the first ring, wherein the fixing screws extend axially through the first ring and are engaged inside threaded holes of the flange.

* * * * *